United States Patent Office 2,724,002
Patented Nov. 15, 1955

2,724,002

PROCESS OF PREPARING HEXACHLOROBENZENE

Jacques Viriot, Tavaux-Cites, France, assignor to Solvay & Cie., Brussels, Belgium, a Belgian company No Drawing. Application April 29, 1952,
Serial No. 285,073

Claims priority, application Belgium May 5, 1951

12 Claims. (Cl. 260—650)

The present invention relates to the manufacture of hexachlorobenzene by chlorinating pyrolysis of the isomers of hexachlorocyclohexane, alone or mixed. The invention is applicable to all the isomers, but is of particular interest for the utilisation of the α and β isomers obtained after extraction of the γ isomer from the crude products of additive chlorination of benzene.

It is known that additive chlorination of benzene is accompanied at relatively high temperatures by secondary substitution reactions which lead to the formation of hexachlorocyclohexane which are chlorosubstituted, as hepta-, octo-, and nonachlorocyclohexanes.

Nonachlorocyclohexane is already obtained at a temperature of the order of 50 to 70° C. by chlorination of hexachlorocyclohexane, according to the reaction:

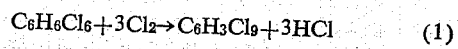

$$C_6H_6Cl_6 + 3Cl_2 \rightarrow C_6H_3Cl_9 + 3HCl \qquad (1)$$

In the specifications of their British Patents Nos. 637,412 and 637,761, the present applicants have described hexachlorocyclohexane by chlorination of benzene carried out at low temperature, precisely to enable these reactions to be avoided.

It is known moreover (Fremy: Encyclopédie chimique, 55, p. 344, and Beilstein (1922), 5, p. 24) that the chlorinated derivatives of hexachlorocyclohexane are decomposed into HCl and chlorobenzenes when they are heated above their melting point. This dissociation is likewise effected in the vapor phase in a process of the applicants described in their French Patent 955,816. This process permits in particular the production of hexachlorobenzene by dissociation of nonachlorocyclohexane vapors at a temperature comprised between 350 and 650° C. in accordance with the reaction:

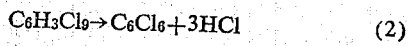

$$C_6H_3Cl_9 \rightarrow C_6Cl_6 + 3HCl \qquad (2)$$

By combining reaction (1) and (2), it is already possible to obtain hexachlorobenzene during the chlorination of melted hexachlorocyclohexane, but this process presents great difficulties in industrial performance.

When the chlorination of a melted hexachlorocyclohexane, for example at 200° C., is conducted non-continuously, the hydrogen chloride formed entrains, through vapor tension, relatively considerable amounts of the reactional liquid mixture. The composition of these vapors varies in time, from hexachlorocyclohexane to hexachlorobenzene, passing through all the intermediate compositions. These entrained products are condensed in the cold parts of the installation, giving rise to numerous obstructions. In addition, these products must be recovered, as otherwise the yield of hexachlorobenzene will be considerably reduced.

When conducted continuously, the process leads to a reactional mixture of hexachlorocyclohexane and hexachlorobenzene of constant composition, from which it is necessary to separate the constituents by crystallisation, distillation, or selective extraction. Furthermore, the disadvantages mentioned above are further accentuated.

The present invention has as object the production of hexachlorobenzene while avoiding the disadvantages of the previous processes, utilising as raw material hexachlorocyclohexane, and principally the α and β isomers of smaller value.

According to the invention, hexachlorobenzene is prepared from hexachlorocyclohexane by introducing into a reaction chamber kept at 350 to 600° C. a mixture of hexachlorocyclohexane vapor and gaseous chlorine in the proportions of more than three mol of chlorine to one mol of hexachlorocyclohexane, and condensing the hexachlorobenzene formed by cooling the vapors leaving the reaction chamber. It is thus possible to obtain directly, without subsequent separation, technical hexachlorobenzene at 96-99%, with a yield which is generally higher than 95%.

The vaporisation of the hexachlorocyclohexane may be effected by introduction of the solid or liquid compound into a vaporiser kept at an adequate temperature, which vaporiser may if desired be constituted by a part of the furnace preceding the reaction chamber proper.

The entraining of hexachlorocyclohexane vapors in the furnace may also be advantageously effected by bubbling a gas into the melted starting substance. This gas may be an inert gas, for example nitrogen, a part of the hydrogen chloride produced by the reaction or else chlorine gas itself. The use of chlorine or hydrogen chloride presents the indisputable advantage of avoiding the subsequent separation of a compound foreign to the reaction.

The reaction chamber is constituted by an empty tube having smooth walls, of materials resisting corrosion at the temperatures envisaged, for example, a tube of quartz or nickel. It has nevertheless been observed—as will be clear from the examples given below—that the operating temperature, the time of contact, and the excess of chlorine to be used to obtain a complete reaction may be substantially reduced when the reaction chamber is filled with a filling having a large contact surface, such as active charcoal, porcelain Raschig rings, refractory materials, quartz waste, and the like.

As has been indicated above, the process presents the advantage that the condensable product entrained by the hydrogen chloride, and where applicable by the inert gas, is constituted exclusively of hexachlorobenzene, the rate of conversion in one pass being substantially 100%. This entrained hexachlorobenzene may be separated by precipitation in a chamber having cold walls, the majority of the product being then deposited on the walls and being able to be removed by a suitable scraping device.

According to an extremely interesting modification to the process of the present invention, the hexachlorobenzene is obtained in a finely divided state by cooling the vapors leaving the reaction chamber, by the introduction of a gas or a vapor at a temperature markedly lower than the melting temperature of hexachlorobenzene. The gas or vapor, if these are compounds foreign to the reaction, will preferably be of the same chemical nature as the agent utilised for the entraining of the vapors of hexachlorocyclohexane. Nitrogen has been advantageously utilised for this purpose, but the recycling of a part of the hydrogen chloride presents the additional advantage of avoiding the introduction of an addition element which must be separated.

This precipitation of the hexachlorobenzene is preferably effected in an apparatus of such a shape that the ratio between the volume of the precipitation chamber and the surface of the walls is relatively high.

The apparatus for precipitation by the injection of inert gas may be preceded by a cooler kept at a temperature slightly above the temperature of solidification of hexachlorobenzene, in such manner as to condense therein a fraction of the latter in the liquid state, and this melted product can then be solidified and brought into the desired form, for example by means of a wheel into the form of cubes or flakes.

*Example I*

The reaction chamber is constituted by an empty quartz tube, having an inside diameter of 50 mm. and a useful length of 600 mm., externally heated in such manner as to maintain the temperature at the centre at 557–585° C. This chamber is surmounted by an evaporator constituted by a quartz tube filled with Raschig rings, into which is introduced a mixture of $\alpha$, $\beta$, and $\delta$ isomers resulting from the manufacture of $\gamma$ isomer, at the rate of 0.5 mol. per hour.

At the entrance of the reaction chamber there are introduced at the same time 2 mol. of chlorine, which corresponds to a chlorination ratio:

$$\frac{\text{mol. Cl}_2}{\text{mol. of hexachlorocyclohexane}} = 4$$

The outgoing vapors are condensed on the walls of a cold chamber kept at atmospheric temperature by the circulation of water.

The product recovered is constituted at 135 gr. of hexachlorobenzene at more than 98%, having a melting point of 226.5° C.

*Example II*

In the apparatus described in Example I, there is introduced per hour 0.5 ml. of technical hexachlorocyclohexane of the following composition:

| | Gr. per kg. |
|---|---|
| $\alpha$ isomer | 620 |
| $\beta$ isomer | 40 |
| $\gamma$ isomer | 250 |
| $\delta$ isomer | 80 |
| Chlorosubstituted products | 10 |

In addition, 1.75 mol. of chlorine per hour is introduced, which corresponds to a chlorination ratio of 3.5.

The temperature at the centre of the furnace being maintained at 600° C., there are collected in one hour in the precipitation chamber 130 gr. of hexachlorobenzene at 96%, with a melting point of 222° C.

*Example III*

The reaction chamber described in Example I is filled with activated charcoal and the temperature at the centre is kept at 375–385° C. There is introduced per hour 0.3 mol. or $\alpha$ isomer of hexachlorocyclohexane entrained in the vapor state by 4 mol. of nitrogen which has been bubbled into the melted isomer.

1.5 mol. per hour of chlorine is simultaneously injected, which corresponds to a chlorination ratio of 5.

The vapors leaving the pyrolysis chamber are mixed with 5 mol. per hour of nitrogen at 20° C. and introduced into a tube having an inside diameter of 100 mm. and a length of 900 mm., in which a considerable fraction of the hexachlorobenzene formed is deposited. The cooled gases are freed from dust in a cyclone separator. The product collected at the rate of 80 gr. per hour contains more than 98% of hexachlorobenzene and is characterised by a melting point of 226° C. It is obtained in the form of a fine powder, of which 63% passes through a sieve having a mesh of 0.064 mm. and 43% through a 0.041 mm. mesh sieve.

*Example IV*

Into the reaction chamber filled with activated charcoal, kept at 450° C., there is introduced 0.7 mol. per hour of $\alpha$ isomer of hexachlorocyclohexane entrained 2.5 mol. of chlorine, which has been bubbled into the melted isomer.

Into the cooling apparatus described in Example III there are injected 4 mol. per hour of cold hydrogen chloride. 186 gr. per hour of hexachlorobenzene having a melting point of 227° C. ($C_6Cl_6 > 98\%$) are collected, the granulometric classification of which is substantially the same as that obtained in Example III.

I claim:

1. A process of making hexachlorobenzene by the reaction of benzene hexachloride and chlorine, which comprises introducing benzene hexachloride in vapor form and chlorine gas into a reaction zone maintained at a temperature of 350° to 600° C. in the proportions of more than three mols of chlorine per mol of benzene hexachloride, thereby forming hexachlorobenzene in the vapor phase, removing the hexachlorobenzene vapor from the reaction zone, and cooling said hexachlorobenzene vapor.

2. A process of making hexachlorobenzene as defined in claim 1, wherein said reaction is carried out in the reaction zone in the presence of contact material providing an extended surface area.

3. A process of making hexachlorobenzene as defined in claim 1, wherein the benzene hexachloride employed comprises the alpha and beta isomers.

4. A process of making hexachlorobenzene by the reaction of benzene hexachloride and chlorine, which comprises vaporizing benzene hexachloride, mixing the resulting vapor with chlorine gas in the proportions of more than three mols of chlorine per mol of benzene hexachloride, introducing the vaporous mixture of chlorine and benzene hexachloride into a reaction zone maintained at a temperature of 350° to 600° C., thereby forming hexachlorobenzene in the vapor phase, removing the hexachlorobenzene vapor from the reaction zone, and condensing said hexachlorobenzene vapor.

5. A process of making hexachlorobenzene by the reaction of benzene hexachloride and chlorine, which comprises vaporizing benzene hexachloride, mixing the resulting vapor with chlorine gas in the proportions of more than three mols of chlorine per mol of benzene hexachloride, heating contact material providing an extended surface area to a temperature of from 350° to 600° C., passing the vaporous mixture of chlorine and benzene hexachloride over said contact material, thereby forming hexachlorobenzene in the vapor phase, removing the hexachlorobenzene vapor from said contact material, and cooling said hexachlorobenzene vapor.

6. A process of making hexachlorobenzene by the reaction of benzene hexachloride and chlorine, which comprises vaporizing benzene hexachloride, entraining the vapor thus formed by means of a gaseous current, mixing the entrained vapor with chlorine gas to provide said chlorine gas in the proportions of more than three mols of chlorine per mol of benzene hexachloride, introducing said benzene hexachloride vapor and said chlorine gas into a reaction zone maintained at a temperature of 350° to 600° C., thereby forming hexachlorobenzene in the vapor phase, removing the hexachlorobenzene vapor from the reaction zone, and cooling said hexachlorobenzene vapor.

7. A process as defined in claim 6, wherein said gaseous current consists of an inert gas.

8. A process as defined in claim 6, wherein said gaseous current consists of chlorine gas.

9. A process of making hexachlorobenzene as defined in claim 1, wherein said cooling of the hexachlorobenzene vapor is effected rapidly by injection of a cold inert gas, thereby precipitating the hexachlorobenzene in a finely divided state.

10. A process of making hexachlorobenzene as defined in claim 1, wherein said cooling of the hexachlorobenzene vapor is effected rapidly by injection of cold hydrogen chloride, thereby precipitating the hexachlorobenzene in a finely divided state.

11. A process of making hexachlorobenzene as defined in claim 1, wherein said cooling is carried out to effect condensation of a portion of the hexachlorobenzene vapor and the remainder of the hexachlorobenzene is then precipitated in a finely divided state by injecting a cold inert gas into the vapor.

12. A process as defined in claim 6, wherein said cooling of the hexachlorobenzene vapor is effected rapidly by injection of cold hydrogen chloride, thereby precipitating the hexachlorobenzene in the form of a fine powder.

References Cited in the file of this patent

FOREIGN PATENTS 955,816  France _____ July 4, 1949

OTHER REFERENCES

Van der Linden: "Rec. des Trav. Chim. des Pays-Bas," vol. 57, pages 217–24 (1938).